Patented Mar. 13, 1951

2,545,183

UNITED STATES PATENT OFFICE 2,545,183

PRODUCTION OF POLYALLYL-TYPE ALCOHOLS FROM POLYALLYL-TYPE FORMATES

Richard R. Whetstone, Berkeley, and Theodore W. Evans, Oakland, Calif., assignors to Shell Development Company, San Francisco, Calif., a corporation of Delaware No Drawing. Application March 24, 1947, Serial No. 736,612

10 Claims. (Cl. 260—91.3)

This invention relates to a process for the production of polyallyl-type alcohols. More particularly the invention relates to a process for the manufacture of polyallyl-type alcohols from polymers of formic acid esters of allyl-type alcohols.

More specifically the invention provides a practical and highly economical method for the production of relatively pure polyallyl-type alcohols from polymers of esters of formic acid and allyl-type alcohols which comprises reacting a polymer of the formic acid ester of the allyl-type alcohol with water and a monohydric alcohol in the presence of an aromatic sulfonic acid, removing the formic acid ester of the monohydric alcohol from the reaction mixture preferably by distillation substantially as fast as it is formed therein, and removing the aromatic sulfonic acid from the polymeric allyl-type alcohol residue preferably by treating it with an acid-removing resin. The polyallyl-type alcohols produced by the process of the invention have a relatively low production cost and possess a very high degree of purity and chemical activity. Such properties are far superior to those of the polyallyl-type alcohols produced by the previously known methods of production and enable the polyallyl-type alcohols produced by the invention to be used for many important industrial applications for which the inferior products of the prior art were entirely unsuited.

Polyallyl-type alcohols, i. e. polymers of monomeric allyl-type alcohols, have shown promise as replacements for glycerol in the production of alkyd resins and in the production of synthetic and semi-synthetic drying oils. The polyallyl-type alcohols are particularly adaptive to this type of utility as they possess a plurality of free hydroxyl groups which are presumably all primary and therefore readily undergo esterification. The structure of the polyallyl-type alcohols is not definitely known but it is presumed that they have a general structure which is conveniently represented by the probable structural formula for polyallyl alcohol:

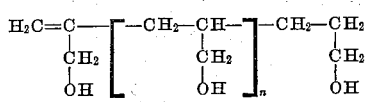

wherein $n$ represents an integer, the value of which is dependent upon the number of monomer units present in the polymer. The above possible structure is suggested for a better understanding of the invention, it being understood that the invention is not to be construed as limited to polymers of such a structure.

Various methods are known for the production of the above-described polyallyl-type alcohols but they have met with such difficulties as to discourage their use to produce the polyallyl-type alcohols on a commercial scale. A direct polymerization of the allyl-type alcohols in general proceeds slowly and incompletely and requires the presence of oxygen-yielding polymerization catalysts for best results. This method does not yield a suitable product as the oxygen-yielding catalyst oxidizes the free primary hydroxyl groups to some extent to aldehyde and/or carboxyl groups and the presence of such groups causes a discoloration of the polyallyl-type alcohols. The method of producing the polyallyl-type alcohols by the water hydrolysis of some of the esters of the polyallyl-type alcohols such as allyl formate has proven unfeasible as the product is produced in low yields and is difficult to purify to the extent desired for commercial purposes. The use of methods depending upon an alkaline hydrolysis of the esters of the polyallyl-type alcohols has, likewise, proved unfeasible as it requires large amounts of expensive alkali, i. e. one equivalent amount of base to the polymer reacted, and secondly, the separation of the salts produced is difficult especially with the polymers of lower allyl-type alcohols which are water soluble. The hydrolysis of the polymeric esters using mineral acids as catalysts has the disadvantage that the polyallyl-type alcohols produced are discolored or have poor color stability. The known methods for the alcoholysis of the esters of the polyallyl-type alcohols by treating the esters with low boiling alcohols have the disadvantage of requiring relatively expensive alcoholates as catalysts and requiring long reaction periods and cumbersome methods for the separation of the final product from the reaction mixture. In general, the known methods are either too expensive or give too impure products to enable the polyallyl-type alcohols to be produced on a scale where they might successfully compete with glycerol and pentaerythritol in the applications described above.

It is an object of the invention, therefore, to provide a practical method for the production of polyallyl-type alcohols which avoids the difficulties of the previously known methods and enables the production of the polymeric alcohols in an efficient and economical manner. It is a further object of the invention to provide a method of manufacture of polyallyl-type alcohols which avoids the use of expensive catalysts and employs a very simple and convenient method for the separation of the final product from reaction mixture. It is a further object of the invention to provide a process for the production of polyallyl-type alcohols which produces high yields of polymeric alcohols which are relatively pure, possess a high resistance to discoloration and possess a plurality of active primary hydroxyl groups. Other objects of the invention will be apparent from the detailed description given hereinafter.

It has now been discovered that polyallyl-type alcohols may be produced in a practical and economical manner by the novel method of reacting a polymer of a formic acid ester of an allyl-type alcohol with water and a monohydric alcohol in the presence of an aromatic sulfonic acid, removing the formic acid ester of the monohydric alcohol substantially as fast as it is formed in the reaction mixture, preferably by distillation, and removing the aromatic sulfonic acid catalyst from the residual reaction mixture, preferably by treating it with an acid-removing resin. It has been further discovered that the polyallyl-type alcohols produced by the process of the invention are formed in relatively high yields and possess a high degree of purity and resistance to discoloration as well as an increased number of free, primary hydroxyl groups. Such an economical and efficient method enables the polyallyl-type alcohols to be produced on a commercial scale where they might compete successfully with other polyhydric alcohols in those utilities demanding a relatively pure and reactive polyhydric compound.

The exact nature of the reactions occurring in the execution of the process of the invention is not definitely known but is thought to consist of a mixed hydrolysis-alcoholysis reaction wherein the water and monohydric alcohol react with the polymeric allyl-type formate, in the presence of an aromatic sulfonic acid to form the formic acid ester of the monohydric alcohol which is readily distilled from the reaction mixture as an azeotrope with water, and the aromatic sulfonic acid is readily removed from the residue by means of an ion-exchange resin. It is preferred to use the allyl-type alcohol employed in the production of the polymer of the formic acid ester as the monohydric alcohol in the reaction for by this preferred method the allyl-type formate recovered may be recycled and used in the production of the basic polymeric allyl-type formate, and in that way greatly reduce the cost of preparing the polyallyl alcohols.

The polyallyl-type formate used in the process of the invention is the polymer of a monomeric ester of formic acid and an allyl-type alcohol. By the term "allyl-type" as used throughout the specification and appended claims is meant those alcohols having an unsaturated linkage, preferably a double bond, between two carbon atoms of aliphatic character, one of which is attached directly to a saturated carbon atom which in turn is attached directly to the hydroxyl group. The carbon atoms of aliphatic character are the carbon atoms in an open chain, for example, the carbon atoms in aliphatic radicals, and also the carbon atoms in cycloaliphatic radicals, e. g. the carbon atoms in the cyclohexyl and cyclohexenyl radicals. Allyl-type alcohols have the structure

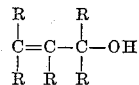

wherein each R is the same or different substituent of the group comprising the hydrogen atom, a halogen atom, or an organic radical. Allyl-type alcohols may also be described as beta-gamma olefinic unsaturated alcohols wherein the carbon atom bearing the hydroxyl group is termed the alpha carbon atom and the unsaturated carbon atoms are the beta, gamma carbon atoms.

Preferred organic radicals which R may represent in the above-described formula for the allyl-type alcohols are the hydrocarbon radicals. Such hydrocarbon radicals are monovalent and may be substituted or unsubstituted, saturated or unsaturated, cyclic or alicyclic or aromatic. Examples of the hydrocarbon radicals which R may represent are methyl, ethyl, propyl, n-butyl, isobutyl, n-pentyl, 2-chloroethyl, hexyl, 2,4-dichlorocyclohexyl, 2,3,5-trimethyldecyl, methyl vinyl carbinyl, phenyl, tolyl, 2-chlorophenyl, 3-acetocyclohexyl, anthryl, 3-bromo-2-cyclohexenyl, 3-vinyl-2-cyclohexenyl, 2-chlorocyclopentyl, and 3-nitro-butyl. The more preferred hydrocarbon radicals which R may represent are the alkyl radicals, preferably the lower alkyl radicals, e. g. methyl, ethyl, propyl and butyl up to those containing 8 carbon atoms.

A particularly preferred group of allyl-type alcohols are those beta-gamma unsaturated alcohols of the first general structural formula given hereinabove wherein each R is a substituent selected from the group consisting of hydrogen and a hydrocarbon radical, preferably an alkyl radical containing of from 1 to 8 carbon atoms with the total number of carbon atoms in the allyl-type alcohol consisting of from 3 to 18 carbon atoms. Representative examples of especially preferred allyl-type alcohols are allyl alcohol, methallyl alcohol, ethallyl alcohol, 2-buten-1-ol, 2-isopropyl-2-propen-1-ol, 2-butyl-2-propen-1-ol, 2-chloromethyl-2-propen-1-ol, 2-ethyl-2-hexen-1-ol, 2-hepten-1-ol and 2-pentyl-2-octen-1-ol.

The monomeric esters of formic acid and the allyl-type alcohols described above may be produced by any suitable process. One method comprises treating a sodium or silver salt of formic acid with the halide of the desired allyl type alcohol in the presence of a catalyst. Another method comprises reacting an ester of formic acid and a low boiling alcohol with the desired allyl-type alcohol wherein there is an exchange of the allyl-type alcohol for the low boiling alcohol in the ester molecule. The simpler and more preferred method, however, is to treat the formic acid directly with the allyl-type alcohol and separate the desired ester from the reaction mixture by distillation.

The polymerization of the monomeric ester of formic acid and the allyl-type alcohol to produce the polymeric formate, which is a reactant in the process of the invention, may be accomplished by any suitable polymerization method. Such methods include the polymerization of the formic acid esters by the application of heat, light and catalysts. The more preferred method is to subject the formic acid ester to heat, preferably in the presence of a polymerization catalyst.

The reaction conditions selected for the polymerization process will determine the molecular weight and structure of the polymeric formate which will in turn determine the molecular weight and structure of the desired polyallyl-type alcohols. The exact polymerization conditions should, therefore, be determined in each case according to the form of polyallyl-type alcohols desired as the final product.

In the preferred method for the polymerization of the esters of formic acid and the allyl-type alcohols by the application of heat in the presence of a polymerization catalyst, the temperature employed will determine the molecular weight of the desired polymer and the reaction temperature may therefore be varied according to the particular molecular weight desired. Temperatures of from about 70° C. to about 90° C. produce polymers having a molecular weight of around 2000. As the temperature is increased the molecular weight of the polymer decreases until at about 250° C. the molecular weight is about 500. Polymers of the esters of formic acid and the allyl-type alcohols having molecular weights in the range of about 2000 to about 500 have given very satisfactory results in the process of the invention and the polymerization temperatures of about 70° C. to about 250° C. are therefore the more preferred. Higher or lower temperatures, however, may be used if deemed desirable or necessary.

The preferred polymerization reaction is conduced in the liquid phase. The pressure to be used in each case will, therefore, depend upon the particular allyl-type formate and particular polymerization temperature to be employed. In those cases where the polymerization is to take place below the boiling point of the desired allyl-type formate atmospheric pressure is preferred, while in those instances where the polymerization is to take place above the boiling point of the ester superatmospheric pressure is required.

The time of polymerization will vary over a considerable period depending upon the particular polymerization temperature selected. The time of polymerization may vary, for example, from about 30 minutes or less when a polymerization temperature of about 250° C. is used to as much as 50 hours when a polymerization temperature of 70° C. is employed.

Catalysts are usually added in the preferred polymerization process to hasten the polymerization. The preferred catalysts are those which are soluble in the polymerizable ester. Benzoyl peroxide has been found very satisfactory. Other polymerization catalysts are acetyl peroxide, succinyl peroxide, sodium peroxide, barium peroxide, tertiary alkyl hydroperoxide, the ditertiary alkyl peroxides, peracetic acid and perphthalic acid. The amount of the catalyst used will vary under various conditions but ordinarily will be between about 0.01% to about 5% by weight of the ester being polymerized.

The polymerization of allyl-type esters in the presence of oxygen and oxygen-yielding catalysts is described and claimed in the copending application of Adelson and Dannenberg, Serial No. 417,278, filed October 31, 1941, now abandoned.

The esters may be polymerized in bulk in the presence or absence of a solvent or diluent. The use of solvents such as iso-octane in some cases tends to assist in decreasing the molecular weight of the final polymer. The polymerization may be carried to completion without substantial interruption or it may be stopped at any point short of completion to obtain the desired extent of polymerization.

The polymers of formic acid and the allyl-type alcohols produced by any suitable method are treated, according to the process of the invention, with water and a monohydric alcohol in the presence of aromatic sulfonic acid to convert the polymer into a polyallyl-type alcohol. The allyl-type alcohol identical to the one used in producing the polymeric formic acid ester is the more preferred of the monohydric alcohols to be used in the reaction. However, other monohydric alcohols may be used. It is preferred, in general, that the other alcohols used be the lower members of the series which contain not more than 6 carbon atoms in the molecule, while the monohydric alcohols containing not more than 4 carbon atoms are still more preferred. The monohydric alcohols may be either saturated or unsaturated. Representative examples of suitable monohydric alcohols are methyl alcohol, ethyl alcohol, n-propyl alcohol, isopropyl alcohol, n-butyl alcohol, the amyl alcohols, the hexyl alcohols, cyclohexanol, allyl alcohol, beta-methallyl alcohol, methyl vinyl carbinol, cyclopentanol, propargyl alcohol and the like. The primary alcohols are the more preferred as it is found that they have greater reactivity than the secondary alcohols.

Any aromatic sulfonic acid may be used as a catalyst in the process of the invention. By the term "aromatic sulfonic acid" as used throughout the specification and appended claims is meant any organic compound containing at least one sulfonic acid group ($-SO_3H$) or sulfonic acid acting group (such as $-SO_2Cl$) directly attached to a carbon atom contained within an aromatic ring. Examples of such compounds are p-toluene sulfonic acid, benzene sulfonic acid, naphthalene sulfonic acid, m-toluene sulfonic acid, 2-hydroxy-4-butylbenzene sulfonic acid, 3-acetobenzene sulfonic acid, 2-ethyl-4-butylbenzene sulfonic acid, m-xylene sulfonic acid, benzene sulfonchloride, 4-chloro-2-ethylbenzene sulfonic acid, mesitylene sulfonic acid and p-cumene sulfonic acid.

The amount of the monohydric alcohol to be added to the reaction mixture should be sufficient to accomplish the desired hydrolysis-alcoholysis reaction and combine with the formic acid being released. In general, the amount of alcohol may vary from slightly more than 1 to about 7 moles for every formate group

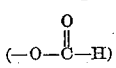

present in the polyallyl-type formate molecule. Larger amounts may be used but, in general, add nothing to the efficiency of the process. Particularly fine results in yield and purity of product are obtained when the amount of the monohydric alcohol taking part in the reaction varies between about 2 to about 4 moles for every formate group present in the polyallyl-type formate molecule, and such a range is the more preferred for the process.

The amount of water added to the reaction mixture to effectuate the combined hydrolysis-alcoholysis reaction may vary over a considerable range. The amount of water added may, for example, vary as high as 48 moles for every formate group present in the polyallyl-type formate molecule to as low as about 2 moles for every formate group present in the polyallyl-type formate molecule. Small amounts of water, i. e. about 2 to about 6 moles for every formate group present in the polyallyl-type formate molecule, in general, produce the desired results, are much more efficient to handle and are, therefore, the more preferred amounts of water to be used in the reaction.

The quantity of the aromatic sulfonic acid catalyst to be added to the reaction mixture may vary over a wide range depending upon the particular polyallyl-type formate being acted upon the speed of the reaction desired. In general, an amount of the aromatic sulfonic acid varying from about .5% to about 5% by weight of the polyallyl-type formate being treated has been found to produce the maximum reaction rates for most of the polyallyl-type formates being treated. An amount of aromatic sulfonic acid greater than about 5% may be used in the reaction mixture but, in general, such an amount causes no further increase in the efficiency of the reaction. Amounts as small as .3% to about 2% usually give efficient reaction rates and are the more preferred quantities of aromatic sulfonic acid to be employed in the reaction.

The combined hydrolysis-alcoholysis reaction takes place at low temperatures, i. e. around room temperatures, but it has been found advantageous to maintain the temperature of the reaction at least above about 50° C. The temperature may vary above 50° C. up to the decomposition temperature of the polymers present in the reaction mixture but, in general, it has been found that the most efficient results are obtained when the temperature is maintained between about 50° C. to about 150° C. and this is the more preferred temperature range to be used for the reaction.

The removal of the ester of formic acid and the monohydric alcohol formed by the hydrolysis-alcoholysis reaction from the reaction mixture may be accomplished by any suitable method. A very efficient method, due to the particular composition of the reaction mixture containing the formic acid ester, is to subject the reaction mixture to distillation wherein the ester of formic acid and the monohydric alcohol is removed as an azeotrope with water. The distillation temperature to be used in this method of separation will depend upon the particular formic acid ester: water azeotrope being distilled. Such temperatures will usually range from about 65° C. to about 95° C., however the exact range may best be determined for each individual case. In the preparation of polyallyl alcohol, for example, using allyl alcohol as the monohydric alcohol and a ratio of reactants of about 1:4:5, the allyl formate: water azeotrope distills at a stillhead temperature of between 74° C. to about 76° C. at 760 mm. of mercury pressure.

After separation of substantially all of the formic acid ester of the monohydric alcohol from the reaction mixture the aromatic sulfonic acid catalyst is then separated from the residual reaction mixture. The removal of the aromatic sulfonic acid catalyst may be accomplished by any suitable method. A method that has proven very effective in removing relatively all of the aromatic sulfonic acid from the residual reaction mixture without injuring the desired polyallyl-type alcohol therein, is to treat the reaction mixture with an acid-removing resin or resin-like material. Substantially any resin or resin-like material capable of removing acid molecules or ions of acid molecules from solutions may be used for this purpose. While the actual mechanism of the removal of the acid by the resin is not definitely understood it is thought that in some cases the resin adsorbs and/or absorbs the acid molecule from the solution while in other cases the anions of the acid molecules are taken into the resinous material in exchange for the hydroxyl ion which is put in solution in their places.

Groups of synthetic resins which are particularly efficient in removing the aromatic sulfonic acids from solution are those resins produced by the condensation of an aldehyde, or substance yielding an aldehyde on hydrolysis, with basic material such as amides or amide-like compounds, amine or amine-like compounds, certain proteins, or mixtures thereof. A few representative examples of such synthetic resins are the formaldehyde-melamine resins, acetaldehyde-aniline resins, butyraldehyde-m-xylidine resins, formaldehyde-guanidine resins, formaldehyde-protein resins, and acetaldehyde-urea resins.

A particularly preferred group of synthetic resins to be used for the removal of the aromatic sulfonic acids are those resins resulting from the condensation of formaldehyde and aromatic polyamines. Examples of the preferred group of resins are resins of formaldehyde-m-phenylenediamine, formaldehyde-m-toluidine, formaldehyde-m-xylidine, formaldehyde-2-hydroxy-3,6-diamino-benzene, formaldehyde-2,5-diaminonaphthalene, formaldehyde-2-chloro-3,6-diaminobenzene, formaldehyde-p-toluidine, formaldehyde-2-acetoxy-4,6-diaminobenzene, formaldehyde-m-ethylaminobenzene and the like.

The above-described acid-removing resins may be produced by any suitable method. A preferred procedure is to bring the parent materials such as formaldehyde and the aromatic polyamines into reaction with one another, preferably in the presence of heat. As the ability of the finished resin to remove the acids from solution depends a great deal upon the free basic groups, e. g. amino groups, present in the resinous material it is sometimes advisable to protect some of the basic groups in the monomeric basic material by acylation and remove the acyl groups by hydrolysis after the condensation reaction is complete.

The condensation of the aldehyde with the basic material is usually hastened by a gentle heating of the mixture of the two components, preferably at a temperature between about 50° C. to about 150° C. The use of higher temperatures in some cases destroys the absorbing properties of the resulting resin.

A gelatinous form is usually the more preferred structure for the acid-removing resins due to the increased amount of surface available for action. For this reason the condensation of the parent materials is usually continued until the formation of a gelatin mass occurs and the reaction is then terminated. The gelatin material is then removed from the reaction and hardened either by drying or by chemical means in order to put the resin in a form capable of being used in the purification process.

The method of using the synthetic resins to remove the aromatic sulfonic acids from reaction mixture of the process of the invention may vary according to the various conditions. One procedure consists of passing the reaction mixture in flowing contact over the surface of layers of the desired resins. Another method consists of preparing the synthetic resin in shreds or fine particles and introducing the granulated resin into the reaction mixture so as to form a slurry. In this latter procedure the slurry is allowed to stand with or without agitation for at least a predetermined minimum length of time, usually 2 to 4 hours after which the synthetic resin is then separated from the residual mixture by decantation and/or filtration.

A more preferred method, however, for removal of the aromatic sulfonic acids by means of the synthetic resins is to allow the reaction mixture to pass slowly through a prepared bed of granular resin contained in a filtering apparatus. The size of the particles of resins used in the filter bed should be as small as possible and yet not small enough to be carried away during the filtration process. In general, particles in the neighborhood of 20 mesh have been found to be very efficient in the process. The filter bed should be of such a thickness and the resin granules compacted to such a degree as to permit a very slow, uniform rate of flow of the solution. The rate of flow of the solution through the filter bed should not exceed maximum rate of flow of about 5 gallons per square foot of resin per minute. The more preferred rates of flow for more efficient removal of the aromatic sulfonic acids, in general, vary between about 2 to 3 gallons per square foot of resins per minute.

The separation of the aromatic sulfonic acids by means of the synthetic resins is preferably effected at about room temperature, although higher or lower temperatures can be used if desired. Temperatures sufficiently high to bring about dissolution or degradation of the absorbing resins under the conditions involved are to be avoided. It has been found, for example, that above temperatures of about 100° C. the formaldehyde-aromatic polyamine resins undergo chemical changes whereby their acid-absorbing properties are altered.

The separation of the aromatic sulfonic acid by the above-described method may be conducted at atmospheric, superatmospheric or reduced pressures. Satisfactory results are obtained when atmospheric pressures are used and they are, in general, the preferred pressures to be used. If desired, oxygen can be substantially excluded, preferably by providing an atmosphere of an inert gas, such as nitrogen, carbon dioxide, etc., free from molecular oxygen.

The resinous material used in the separation of the aromatic sulfonic acids from the reaction mixture may be regenerated for further use by merely passing a basic solution such as sodium hydroxide and sodium bicarbonate over or through the resinous material in order to remove the absorbed acid molecules or ions of acid molecules.

After the removal of the aromatic sulfonic acid the residual reaction mixture will consist of polyallyl-type alcohol, water and the monohydric alcohol. The water and monohydric alcohol are readily removed from the polyallyl-type alcohol by distilling the mixture under reduced pressure at a temperature above the azeotropic distillation temperature. To remove the water and allyl alcohol in the example cited above for the preparation of polyallyl alcohol the temperature is raised from 76° C. (azeotropic distillation temperature) to between about 100° C. to about 120° C. at 2 to 4 mm. mercury pressure.

The process for the production of the polyallyl-type alcohols disclosed above may be conducted in any type of vessel or apparatus enabling intimate contact of the reactants, application of heat to the reaction chamber and final separation of the monomeric ester of formic acid and the separation of the aromatic sulfonic acid catalyst. It may be conducted in a continuous, semi-continuous or batch-wise manner. If a continuous process is resorted to it may be so arranged as to permit the unreacted reactants to be recovered and recycled to the reaction chamber, or in those cases where the monohydric alcohol used in the reaction is identical with the alcohol used to produce the polymeric formic acid ester it may be preferably arranged so as to permit the allyl-type formate recovered in the final purification process to be recycled to the polymerization step.

The process of the invention is characterized by the economy with which it may be carried out and by the purity and high activity of the polyallyl-type alcohols produced therefrom. The polyallyl-type alcohols produced are colorless viscous liquids to solids possessing a linear type structure of from about 6 to about 30 or more of the basic monomeric allyl-type alcohols having a structural formula presumably like that described hereinabove. The products thus possess about 6 to about 30 or more free primary hydroxyl groups which are highly reactive and make their use in the production of alkyl resins, etc., highly desirable. They are particularly superior to polyvinyl alcohol in this regard as the hydroxyl groups in polyvinyl alcohol are secondary in character, and they are superior to glycerols wherein the hydroxyl groups are primary and secondary.

The polyallyl-type alcohols produced by the invention have a great variety of applications. They are useful, for example, as sizing materials for textiles and fabrics, as greaseproof impregnating agents for paper and the like. The usefulness of the products as chemical intermediates is extensive. They may react with polycarboxylic acids or anhydrides to form new alkyd resins, with aldehydes to form resinous acetyls, with nitric acid to form nitrate explosives, and with unsaturated acids to give drying oils.

To illustrate the manner in which the process of the invention may be carried out the following examples are given. It is to be understood, however, that the examples are for the purpose of illustration and the invention is not to be regarded as limited to any of the reactants or operative procedures recited therein.

*Example I*

Polyallyl formate is produced by subjecting liquid allyl formate containing about 1% by weight of di-tertiary butyl peroxide to a temperature of between about 200° C. and 210° C. The resulting polymer is a light yellow liquid with a Gardner-Holdt viscosity of $Z_1$—$Z_2$, and an average molecular weight of about 665 (ebullioscopic in toluene) equivalent to a polymerization degree of 7.7.

Approximately 207 parts of the polyallyl formate produced above is heated under a column with about 582 parts of allyl alcohol, 259 parts of water and about 1 part of p-toluene sufonic acid as the catalyst. The temperature of the mixture is increased and the allyl formate-water azeotrope distilled off at 74° C. to 76° C. At the end of 7.5 hours about 95% of the calculated amount of allyl formate is recovered. The reaction mixture is then passed through a filter bed consisting of granules of m-phenylenediamine-formaldehyde resin in order to remove the p-toluene sulfonic acid. A further distillation of the mixture to about 120° C., 2–5 mm. of mercury, removes the water and allyl alcohol. The residue remaining in the flask is solid polyallyl alcohol having an acetyl value of 1.40 eq./100 g., and an ester value of .038 eq./100 g.

*Example II*

Approximately 200 parts of the polyallyl formate produced above is heated under a column with about 432 parts of allyl alcohol, 86 parts of water and about 1 part of benzene sulfonchloride as the catalyst. The temperature of the mixture is increased and the allyl formate-water azeotropic mixture distilled off at 74° C. to 76° C. At the end of 6 hours about 97% of the calculated amount of allyl formate is recovered. The reaction mixture is then passed through a filter bed comprising granules of a formaldehyde-p-toluidine resin in order to remove the benzene sulfonchloride catalyst. A further distillation of the mixture to about 120° C., 2-5 mm. of mercury, removes the water and allyl alcohol. The residue remaining in the flask is a clear solid polyallyl alcohol having an acetyl value of 1.402 eq./100 g., and an ester value of .046 eq./100 g.

Example III

Polymethallyl formate is produced by subjecting liquid methallyl formate containing about 2% by weight of di-tertiary butyl peroxide to a temperature of about 210° C. The resulting polymer is a light yellow liquid having an average molecular weight of about 700.

Approximately 200 parts of the polymethallyl formate produced above is heated under a column with about 580 parts of methallyl alcohol and about 259 parts of water with about 1 part of benzene sulfonic acid as the catalyst. The methallyl formate-water azeotrope is distilled off by alternate total reflux and total take off. After about 8 hours of treatment 97% of the calculated methallyl formate is recovered. The reaction mixture is then passed through a filter bed consisting of granules of a formaldehyde-m-ethylaminobenzene resin in order to remove the benzene sulfonic acid catalyst. A further distillation of the mixture removes the water and methallyl alcohol. The residue remaining in the flask is a clear solid polymethallyl alcohol.

Example IV

Approximately 207 parts of the polyallyl formate produced in Example I is heated under a column with about 432 parts of ethyl alcohol and about 86 parts of water and about 1 part of 3-acetobenzene sulfonic acid as the catalyst. The temperature is raised to permit a removal of the ethyl formate as an ethyl formate-water azeotrope. After 12 hours of treatment about 95% of the calculated amount of ethyl formate is recovered. The reaction mixture is then passed through a filter bed comprising granules of a formaldehyde-m-xylidine resin in order to remove the 3-acetobenzene sulfonic acid catalyst. A further distillation of the mixture removes the other impurities to give a clear, solid residue of polyallyl alcohol.

Example V

Approximately 200 parts of the polymethallyl formate produced in Example III is heated under a column with about 550 parts of butyl alcohol and about 259 parts of water with about 2 parts of p-toluene sulfonic acid. The butyl formate-water azeotrope is distilled over to give a 94% recovery of the theoretical amount of the butyl formate. The reaction mitxure is then passed through a filter bed consisting of granules of m-phenylenediamine-formaldehyde resin in order to remove the p-toluene sulfonic acid. Further distillation removes the solvents and gives a clear, solid residue of polymethallyl alcohol.

We claim as our invention:

1. A process for the production of polyallyl alcohol which comprises heating polyallyl formate with allyl alcohol and water in the presence of .5% by weight of p-toluene sulfonic acid based on the weight of polyallyl formate, removing the formed allyl formate from the reaction mixture by distillation substantially as fast as it is formed therein, and removing the p-toluene sulfonic acid from the reaction mixture by treating it with a formaldehyde-m-phenylenediamine resin, the allyl alcohol and water being added to the initial reaction mixture in sufficient quantities to furnish 4 moles of alcohol and 5 moles of water for every formate group present in the polyallyl formate molecule, and said heating being conducted at a temperature of between about 70° C. and about 100° C.

2. A process for the production of polyallyl alcohol which comprises heating polyallyl formate with ethyl alcohol and water in the presence of about 1% by weight of benzene sulfonic acid based on the weight of the polyallyl formate, removing the formed ethyl formate from the reaction mixture by distillation substantially as fast as it is formed therein, and removing the benzene sulfonic acid from the reaction mixture by treating it with a formaldehyde-aromatic polyamine resin, the ethyl alcohol and water being added to the initial reaction mixture in sufficient quantities to furnish from 2 to 4 moles of alcohol and from 2 to 6 moles of water for every formate group present in the polyallyl formate molecule, and said heating being conducted at a temperature of between about 50° C. and the decomposition temperature of the polymers present in the reaction mixture.

3. A process for the production of polymethallyl alcohol which comprises heating polymethallyl formate with methallyl alcohol and water in the presence of about 1% by weight of p-toluene sulfonic acid based on the weight of polymethallyl formate, removing the formed methallyl formate from the reaction mixture by distillation substantially as fast as it is formed therein, and removing the p-toluene sulfonic acid from the reaction mixture by treating it with an acid-removing synthetic resin, said methallyl alcohol and water being added to the initial reaction mixture in sufficient quantities to furnish from 2 to 4 moles of alcohol and 2 to 6 moles of water per formate group present in the polymethallyl formate molecule, and said heating being conducted at a temperature of between about 50° C. and the decomposition temperature of the polymers present in the reaction mixture.

4. A process for the production of polyallyl alcohol which comprises heating polyallyl formate with allyl alcohol and water in the presence of 0.3% to 2% by weight of p-toluene sulfonic acid based on the weight of polyallyl formate, removing the formed allyl formate from the reaction mixture substantially as fast as it is formed therein, and removing the p-toluene sulfonic acid from the reaction mixture by treating it with an acid-removing synthetic resin, said allyl alcohol and water being added to the initial reaction mixture in such quantities as to furnish from 2 to 4 moles of alcohol and 2 to 6 moles of water per formate group present in the polyallyl formate molecule, and said heating being conducted at a temperature of between about 70° C. and the decomposition temperature of the polymers present in the reaction mixture.

5. A process for the production of polyallyl alcohol which comprises reacting polyallyl formate with water and a monohydric alcohol of the group consisting of beta-gamma monoolefinic, monohydric alcohols containing from 3 to 18 carbon atoms, and saturated, monohydric alcohols containing from 1 to 6 carbon atoms, in the presence of 0.3% to 2% by weight of an aromatic sulfonic acid based on the weight of the polyallyl formate, removing the formed ester of the monomeric monohydric alcohol and formic acid from the reaction mixture substantially as fast as it is formed therein and subsequently removing the aromatic sulfonic acid from the resulting polyallyl alcohol, the monohydric alcohol and water being added to the initial reaction mixture in such quantities that there will be at least in excess of one mole of monohydric primary alcohol and at least two moles of water for each formate group present in the polyallyl formate molecule.

6. A process for the production of a polymer of a beta-gamma monoolefinic, monohydric alcohol containing from 3 to 18 carbon atoms which comprises heating a polymer of an ester of (1) formic acid and (2) the said beta-gamma monoolefinic, monohydric alcohol with water and a monomeric beta-gamma monolefinic, monohydric alcohol containing from 3 to 18 carbon atoms in the presence of .5% to 5% by weight of an aromatic sulfonic acid based on the weight of the polymer of the formic acid ester, removing the formed ester of formic acid and the monomeric beta-gamma monoolefinic, monohydric alcohol from the reaction mixture by distillation substantially as fast as it is formed therein and removing the aromatic sulfonic acid from the reaction mixture by treating the said mixture with an acid-absorbing synthetic resin, the said beta-gamma-monoolefinic monohydric alcohol and water being added to the reaction mixture in sufficient quantities to furnish from 2 to 4 moles of alcohol and 2 to 6 moles of water per formate group in the polymer of the formic acid ester, and said heating being conducted at a temperature between 50° C. and the decomposition temperature of the polymers present in the reaction mixture.

7. A process for the production of a polymer of a beta-gamma monoolefinic, monohydric alcohol containing from 3 to 18 carbon atoms which comprises heating a polymer of an ester of (1) formic acid and (2) the said beta-gamma monoolefinic, monohydric alcohol with water and a monomeric saturated, monohydric alcohol containing from 1 to 6 carbon atoms in the presence of .5% to 5% by weight of an aromatic sulfonic acid based on the weight of the polymer of the formic acid ester, removing the formed ester of formic acid and the monomeric, saturated, monohydric alcohol from the reaction mixture by distillation substantially as fast as it is formed therein, and removing the aromatic sulfonic acid from the reaction mixture by treating the said mixture with an acid-absorbing synthetic resin, the saturated monohydric alcohol and water being added to the initial reaction mixture in sufficient quantities to furnish from 2 to 4 moles of alcohol and 2 to 6 moles of water per formate group present in the polymer of the formic acid ester, and said heating being conducted at a temperature between 50° C. and the decomposition temperature of the polymers present in the reaction mixture.

8. A process for the production of a polymer of a beta-gamma monoolefinic, monohydric alcohol containing from 3 to 18 carbon atoms which comprises reacting a polymer of an ester of (1) formic acid and (2) the said beta-gamma monoolefinic, monohydric alcohol with water and a primary alcohol of the group consisting of beta-gamma monoolefinic, monohydric alcohols containing from 3 to 18 carbon atoms and a monomeric saturated, monohydric alcohol containing from 1 to 6 carbon atoms, in the presence of 0.3% to 2% by weight of an aromatic sulfonic acid based on the weight of the said polymer of the formic acid ester, removing the formed ester of formic acid and the monomeric, monohydric alcohol from the reaction substantially as fast as it is formed therein, and subsequently removing the aromatic sulfonic acid from the resulting reaction mixture, the monomeric monohydric alcohol and water being added to the initial reaction mixture in such quantities that there will be at least in excess of one mole of monomeric monohydric alcohol and at least two moles of water for each formate group present in the said polymer of the formic acid ester.

9. A process for producing polyallyl alcohol which comprises heating polyallyl formate with allyl alcohol and water in the presence of 0.5% to 5% by weight of an aromatic sulfonic acid based on the weight of the polyallyl formate, removing the formed allyl formate from the reaction mixture substantially as fast as it is formed therein and removing the aromatic sulfonic acid from the reaction mixture by treating it with an acid-removing synthetic resin, the allyl alcohol and water being added to the initial reaction mixture in such quantities that there will be at least in excess of one mole of allyl alcohol and at least two moles of water for every formate group present in the polyallyl formate molecule, and said heating being conducted at a temperature between 50° C. and the decomposition temperature of the polymers present in the reaction mixture.

10. A process for producing a polymer of a beta,gamma-monoolefinic, monohydric alcohol containing from 3 to 18 carbon atoms which comprises reacting a polymer of an ester of (1) formic acid and (2) a beta,gamma monoolefinic, monohydric alcohol containing from 3 to 18 carbon atoms with water and a monomeric beta,gamma-monoolefinic, monohydric alcohol identical with the one used in the preparation of the said polymer, in the presence of 0.5% to 5% by weight of an aromatic sulfonic acid based on the weight of the said polymer of the formic acid ester, removing the formed ester of formic acid and the monomeric monohydric alcohol from the reaction mixture substantially as fast as it is formed therein, and separating the aromatic sulfonic acid from the resulting mixture by treating the said mixture with an acid-absorbing synthetic resin, the monomeric beta,gamma-monoolefinic, monohydric alcohol and water being added to the initial reaction mixture in such quantities that there will be at least in excess of one mole of the said monomeric alcohol and at least two moles of water for every formate group present in the polymer of the formic acid ester.

RICHARD R. WHETSTONE.
THEODORE W. EVANS.

REFERENCES CITED

The following references are of record in the file of this patent:

UNITED STATES PATENTS

| Number | Name | Date |
| --- | --- | --- |
| 2,332,900 | D'Alelio | Oct. 26, 1943 |
| 2,378,169 | Agre et al. | June 12, 1945 |
| 2,467,105 | Adelson et al. | Apr. 12, 1949 |